United States Patent [19]

Woo et al.

[11] Patent Number: 5,077,354

[45] Date of Patent: Dec. 31, 1991

[54] ACRYLIC MODIFIED SILICONE RESIN

[75] Inventors: James T. K. Woo, Medina; Richard M. Marcinko, Royalton, both of Ohio

[73] Assignee: The Glidden Company, Cleveland, Ohio

[21] Appl. No.: 109,415

[22] Filed: Oct. 16, 1987

Related U.S. Application Data

[63] Continuation-in-part of Ser. No. 7,973, Jan. 28, 1987, abandoned.

[51] Int. Cl.$^5$ .............................................. C08G 77/42
[52] U.S. Cl. ...................................... 528/26; 528/27; 525/479
[58] Field of Search ................... 528/26, 27; 525/479, 525/101, 103

[56] References Cited

U.S. PATENT DOCUMENTS

| | | | |
|---|---|---|---|
| 3,003,992 | 10/1961 | Mabrey et al. | 525/103 |
| 3,650,812 | 3/1972 | Nordstrom et al. | 528/26 |
| 4,368,290 | 1/1983 | Alberts et al. | 528/26 |
| 4,446,259 | 5/1984 | Vasta | 525/103 |
| 4,590,235 | 5/1986 | Troy | 524/439 |

*Primary Examiner*—Melvyn I. Marquis
*Assistant Examiner*—R. Dean, Jr.
*Attorney, Agent, or Firm*—Thomas M. Schmitz

[57] ABSTRACT

A polymeric mixture comprising a graft copolymer of silicone resin is useful as a polymeric binder in paint coatings and particularly powder coatings. The polymeric mixtures are produced by copolymerizing ethylenically unsaturated monomers including glycidyl monomers in the presence of silicone resin to produce the graft silicone resins.

4 Claims, No Drawings

ACRYLIC MODIFIED SILICONE RESIN

BACKGROUND OF THE INVENTION

This is a continuation-in-part of Ser. No. 007,973 filed Jan. 28, 1987, now abandoned and the same is incorporated herein by reference.

This invention pertains to acrylic modified silicone resin useful in powder coatings and particularly to a process and composition based on in-situ copolymerization of monomers including glycidyl monomers in the presence of silicone resin.

Acrylic resins containing glycidyl groups are useful in powder coatings and are known to exhibit good weathering properties if the acrylic copolymer does not contain appreciable amounts of copolymerized styrene. Acrylic copolymers of silicone resin should provide substantially improved weathering properties as well as offset some of the deficiencies with silicone resins. However, attempting to coreact hydroxyl containing acrylic copolymers with silicone resins is difficult to achieve in practice since the reaction is difficult to control and often results in cross-linked polymer known as gels. The reaction is difficult to control due to hydroxyl groups or other functional groups on the acrylic polymer as well as the preponderance of hydroxyl groups or alkyl ether groups on silicone resins, which coreact to cause a gel either during synthesis or subsequently during a solvent stripping step.

It now has been found that glycidyl acrylic copolymers in combination with silicone resins can be produced by in-situ copolymerization of ethylenic monomers, including glycidyl monomers, in the presence of silicone resins containing hydroxyl and/or alkyl ether groups to provide a fluid non-gelled copolymer mixture, believed to be a graft copolymer of silicone, useful as a polymeric binder in powder coatings. Such powder coating exhibits superior weathering properties and similarly improved film integrity properties. In this invention, hydroxyl and carboxyl containing monomers are not necessary and preferably avoided to avoid gellation. In accordance with this invention, glycidyl containing monomers are copolymerized with other ethylenic monomers in the presence of silicone resin to produce a graft silicone polymer. These and other advantages of this invention will become more apparent by referring to the detailed description of the invention and the illustrative examples.

SUMMARY OF THE INVENTION

Briefly, the invention pertains to a process and resulting composition produced by in-situ copolymerization of ethylenically unsaturated monomers, including acrylic monomers and glycidyl monomers, in the presence of silicone resin containing hydroxyl or lower alkyl ether groups to produce a stabilized, non-gelled acrylic-silicone copolymer mixture. The in-situ polymerization process in the presence of silicone can be in bulk (solvent-free) or in the presence of organic solvent which can be subsequently stripped from the resulting polymer mixture. The polymer can be combined with other components to produce a clear or pigmented binder system for powder coatings.

DETAILED DESCRIPTION OF THE INVENTION

The process and composition of this invention pertain to the in-situ copolymerization of ethylenically unsaturated monomers, including acrylic monomers and glycidyl monomers, in the presence of silicone resin.

Referring first to the ethylenically unsaturated monomers, ethylenic monomers contain carbon-to-carbon unsaturation and include vinyl monomers, acrylic monomers, allylic monomers, acrylamide monomers, and mono- and dicarboxylic unsaturated acids. Vinyl monomers include vinyl esters, vinyl acetate, vinyl propionate, vinyl butyrates, vinyl benzoates, vinyl isopropyl acetates and similar vinyl esters; vinyl halides such as vinyl chloride, vinyl fluoride, and vinylidene chloride; vinyl aromatic hydrocarbons such as styrene, methyl styrenes and similar lower alkyl styrenes, chlorostyrene, vinyl toluene, vinyl naphthalenes, divinyl benzoate, and cyclohexene; vinyl aliphatic hydrocarbon monomers such as alpha olefins such as ethylene, propylene, isobutylene, and cyclohex as well as conjugated dienes such as 1,3 butadiene, methyl-2-butadiene, 1,3-piperylene, 2,3 dimethyl butadiene, isoprene, cyclopentadiene, and dicyclopentadiene; and vinyl alkyl ethers such as methyl vinyl ether, isopropyl vinyl ether, n-butyl viyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylate. Acrylic acids include acrylic and methacrylic acid, ethacrylic acid, alpha-chloroacrylic acid, alpha-cycanoacrylic acid, crotonic acid, beta-acryloxy propionic acid, and beta-styrl acrylic acid. N-alkylol amides are acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or isobutyl alkyl groups. Hydroxyl functional monomers are hydroxy containing ethylenically unsaturated monomers including hydroxyl alkyl acrylates such as 2-hydroxyl ethyl acrylate and methacrylate, 2-hydroxypropyl acrylate and methacrylate, and similar hydroxy alkyl acrylates, although hydroxy containing monomers are not preferred and advantageously avoided.

In accordance with this invention, glycidyl monomers are oxirane monomers characteristically containing oxirane functionality:

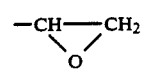

in addition to pendant ethylenic double bond unsaturation. Glycidyl monomers include for instance acrylic, methacrylic, or vinyl monomer derivatives of glycidyl and include, for example glycidyl acrylate, glycidyl methacrylate and similar lower alkyl acrylates, and allyl glycidyl ether. The glycidyl monomers can be copolymerized with the other ethylenically unsaturated monomers in the presence of silicone resin in accordance with this invention.

In accordance with this invention, the acrylic monomers comprise by weight based on monomers copolymerized, between 30% and 95% acrylic monomers, between 1% and 50% glycidyl monomer, with the balance being other ethylenic monomers.

Referring now to the silicone resins useful in this invention, silicon resins are based on a chemical backbone structure comprise alternate silicon and oxygen atoms, where methyl groups primarily or other lower alkyl groups or phenyl groups are attached to the silicon atoms, provided that hydroxyl groups (silanol groups) or lower alkyl ether (methoxy silane groups) are available and attached to silicon atoms for curing purposes. Silicone resins are prepared from organochlorosilanes such as methyltrichlorosilane, phenyltrichlorosilane, and dimethyldichlorosilane, which can be coreacted with an organic halide such as methyl chloride or chlorobenzene in the presence of silicon and copper catalyst to produce chlorobenzene in the presence of silicon and copper catalyst to produce chlorosilanes which can be further reacted with water to form hydroxysilanes and dehydrolysis to eventually organopolysiloxanes (silicones). Silcone resins have the generalized structure:

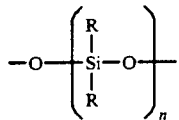

wherein most commercial silicones the R=methyl, but can include lower alkyl, fluoroalkyl, phenyl, vinyl and as part of the silicone resin polymer can include hydrogen, chlorine, alkoxyl, ocyloxy, or alkylamino groups; and where n represents monofunctional, difunctional, trifunctional, and quadrafunctional monomer units in the silicone polymer. Useful silicone resins in accordance with this invention have a number average molecular weight above 500, preferably between 600 and 8000 and have more than 1, preferably at least 2 hydroxyl (silanol) groups and/or alkyl ether (methoxy silane) groups per Si atom and preferably between 2 and 3 silanol and/or methoxy silanol groups (including fractions) per Si atom. Molecular weights can be determined by gel permeation chromatography (GPC) in accordance with ASTM D3016-72, ASTM D3536-76, ASTM D3593-80, and/or ASTM 3016-78.

A preferred siloxane component is a cyclic silanol having at least two SIOH groups per molecule and wherein some of the non-hydroxy valence bonds of the silanol contribute to the cyclic structure. Preferred polyfunctional silicones include those set forth in U.S. Pat. Nos. 3,912,670 and 4,107,148, both incorporated herein by reference. The most preferred hydroxy functional silicone is Z-6018 (Dow Corning) which is a hydroxy functional, low molecular weight, silicone having a molecular weight of about 600 and a theoretical formula:

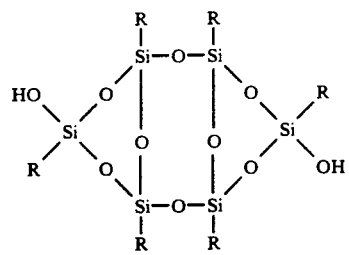

where R is independently lower alkyl or phenyl groups and particularly methyl, ethyl, and phenyl groups. Physical properties of Z-6018 are as follows:

| Appearance | Flaked solid |
|---|---|
| Theoretical Silicone Content, wt. percent | 96.6 |
| Nonvolatile Content, percent | 98.0 |
| Volatility, 1.5 gms for 3 hrs at 482 F. (250 C.), percent | 4.5 |
| Hydroxyl Content | |
| weight percent total | 6.4 |
| hydroxy no. | 211 |
| weight percent free | 0.5 |
| Specific Gravity at 77 F. (25 C.) | 1.23 |
| Durran Melting Point, degrees | 185 F (85 C.) |

The desired crystallinity, tack temperatures and flow properties are derived from a rigid diacid, a multifunctional glycol and hydroxy-functional cyclic siloxanes. It is believed, without being bound thereto, that the advantageous properties of the instant powder coatings result in part from a controlled linearity resulting from the use of rigid diorganic acids and the inherent structure provided by the cyclic siloxanes having a terminal hydroxyl groups Si(R)—OH functionality and in part from the contribution of a high silicon content. The preferred siloxane is Z-6018 and self-condensation products thereof. Such products may contain up to twelve units of the above-identified siloxane and have molecular weights of from about 600 to about 8,000.

The in-situ composition of this invention comprises on a polymeric weight basis between 30% and 90% copolymerized monomers (including acrylic and glycidyl monomer) with the balance being silicone resin.

In accordance with the process of this invention, silicone resin is dispersed into an organic solvent such as aromatic hydrocarbons including xylene, toluene, benzene, or aliphatic hydrocarbons or derivatives thereof such as chlorinated hydrocarbons, esters or ketones. To provide solubility for the subsequent addition of ethylenic monomers the aliphatic or aromatic hydrocarbons can be mixed with alkyl alcohols such as methanol, ethanol, propanol, butanol as well as other solvents such as ethylene glycol monobutyl ether, ethylene glycol monobutyl ether acetate, and hexane.

The solvated silicone resin is then heated to temperatures preferably between about 50° C. and 150° C., depending on the solvents and monomers as well as the polymerization initiator and the stage of the copolymerization of monomers. The ethylenically unsaturated monomers are then added to the heated solvated silicone resin over a period of time to effect in-situ copolymerization of the monomers in the presence of silicone resin. Suitable initiators for promoting copolymerization of the monomers include, for example, hydrogen peroxide, ammonium persulfate, sodium persulfate, or potassium persulfate. The peroxide catalyst is effectively coupled with a reducing agent such as an alkali metal, sulfite, bisulfite, or metabisulfite, or hydrosulfite or hydrazine. Other suitable initiators include organic or inorganic azo catalysts, such as azodiisobutyronitrile, azodiisobutyramide, or diethyl azodiisobutyrate. Example of other suitable azo catalysts include dimethyl or dibutyl azodiisobutyrate, azobis(alpha,v-dimethylvaleronitrile), azobis(alpha-methylbutyronitrile), azobis(alpha-methylvaleronitrile), dimethyl or diethyl azobismethylvalerate, and the like. Preferred such initiators comprise the persulfates, such as potassium persulfate, sodium persulfate, ammonium persulfate, and the like. Another useful class of initiators comprises percarbonates, such as diisopropyl percarbonate, and the like. Another useful class of initiators for this in situ polymerization comprises organic peroxides. One group of suitable peroxides comprises diacyl peroxides, such as benzoyl peroxide, lauroyl peroxide, acetyl peroxide, caproylperoxide, butyl perbenzoate, 2,4-dichloro benzoyl peroxide, p-chlorobenzoyl peroxide, and the like. Another group comprises ketone peroxides, such as methyl ethyl ketone peroxide and the like. Another group comprises alkyl hydroperoxides such as t-butyl hydroperoxide, and the like.

After the copolymerization of the monomers is completed, the in-situ formed polymer mixture comprises acrylic copolymer and silicone resin, believed to include graft copolymer of silicone resin. The solvent can be stripped off without causing gellation and provides an exceptionally good binder useful in powder coatings. The resulting polymer can be cured or cross-linked in use to form a fully cured protective film exhibiting superior weatherability and similar film integrity properties. The polymeric composition can be cured with the addition of a diacid or polyfunctional acid. Diacids for example can include aliphatic having 1-18 or more carbon atoms, aromatic, dimer fatty acids, or unsaturated diacids. Saturated diacids include dodecanoic, succinic, glutaric, adipic, pimetic, suberic, azelaic, and sebacic acids. Aromatic acids include anhydride forms including the o-, p-, m- phthalic isomers, isophthalic, terephthalic tetrahydrophthalic, hexahydrophthalic, and trimellitic acid, as well as diphenyl or higher dicarboxylic acids such as p,p-diphenylether dicarboxylic acid, diphenyl lower alkyl dicarboxylic acid such as methyl, ethyl, propyl, bis A, and similar diphenyl or aromatic diacids.

The acrylic-silicone binder of this invention can be thoroughly and uniformly mixed with raw batch ingredients by homogenizing the binder, pigmentary solids, plasticizers and other components to uniformly blend the resinous binder with the pigmentary solids. Pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, woolastonite, wood flower and the like can be added. The raw batch ingredients can be thoroughly mixed in a high intensity mixer such as a frustroconical agitator whereby the materials are discharged in a uniform mixture. The high intensity mixer discharges the batch components to a heated screw extruder. The extrudate emerges from the extruder as a ribbon of less than abut 1/16 inch thickness which passes onto a water cooled stainless steel conveyor belt whereby the plastic ribbon extrudate fully hardens. The cooled extrudate then passes through a mechanical commuter discharged at the end of the cooled stainless steel belt to efficiently break the fragile brittle ribbon into very small flakes. The small flakes are then discharged onto a cooled mill, such as a hammer mill, to grind the small particles onto powder paint of less than 325 mesh and preferably passing a 200 mesh U.S. Standard sieve screen whereupon the powder can be further classified into particle size if desired.

The powder paints in accordance with this invention can be applied to a steel panel substrate and moderately heated between temperatures of abut 80° C. and 100° C. to obtain desirable flow out.

The foregoing describes the in-situ copolymerization of ethylenically unsaturated monomers, including acrylic and glycidyl monomers, in the presence of silicone resin to form an interpenetrating network of polymers believed to be an acrylic graft of silicone resin. The polymeric mixture is useful as a binder system in powder coatings as further illustrated in the following examples wherein percentages are by weight and temperatures are in °C., unless otherwise indicated.

EXAMPLE 1

Preparation of Glycidylmethacrylate Containing Acrylic Powder Resin

Into a 5-liter roundbottom 4 necked flask was charged 750 g. of toluene. Through the 4 necks were placed a monomer addition funnel, a water cooled condenser, an air driven stirring motor and nitrogen inlet. The toluene was heated to 108° C. with a nitrogen banket and a monomer composition of the following:

|  | Grams |
|---|---|
| glycidyl methacrylate | 294 |
| methyl methacrylate | 570 |
| butyl acrylate | 172 |
| styrene | 127 |
| methacrylic acid | 12 |
| mercapto ethanol | 12 |
| VAZO 64 | 23 | was slowly added to the following toluene in 3 hours. At the end of the monomer addition the temperature rose to 114° C. The reaction mixture was held for 3 hours at 114°-116° C. and then cooled for the night. The next morning, the reaction mixture was heated to 90° C. and a vacuum of 23" of Hg was applied to strip off the solvent. When most of the solvent was stripped off, the resin was poured out onto aluminum foil. Viscosity of the resin on a ICI Cone and Plate viscometer at 200° C. was 25 poise, tack temperature of resin was 177° F. Weight average molecular weight from gel permeation chromatography (GPC) was 33600 and the number average molecular weight was 4670.

EXAMPLE 2

Preparation of Silicone-Glycidyl Methacrylate Graft Acrylic Powder Resin

Into a 5-liter round bottom 4-necked flask was charged 750 g. of toluene and heated to 99° C. with a nitrogen blanket. 379 g. of a solid silicone resin Z6018 (from Dow Corning Company, Midland, Mich.), a hydroxy functional low molecular weight, silicone having a hydroxyl No. of 211, was added and dissolved in toluene.

A monomer mixture consisting of the following:

|  | Grams |
| --- | --- |
| glycidyl methacrylate | 294 |
| methyl methacrylate | 570 |
| butyl acrylate | 178 |
| styrene | 133 |
| mercapto ethanol | 12 |
| Azobis polymerization initiator (VAZO 64) | 23 | was added to the silicone resin solution at 109°–117° C. The monomer addition took about three hours, and 5.2 ml of water was collected. The reaction mixture was held at 117° C. for three hours and then let cool overnight. The next morning the grafted reaction mixture was heated to about 108° C. with 23" of vacuum, and most of the solvent was stripped off. The hot resin was then poured onto a sheet of aluminum foil. The tack temperature of the resin is 192° F., ICI cone and plate viscosity is 28 poise at 200° C., the nonvolatile is 100%.

EXAMPLE 3

Preparation of silicone-glycidyl methacrylate graft acrylic power resin

Into a 5-liter round bottom 4 necked flask was charged 750 g. of toluene and heated to 90° C. with a nitrogen blanket. Then 379 g. of a solid silicone resin Z-6018 (from Dow Corning) was added and dissolved in toluene. The structure of the silicone resin is believed to be of the following as shown above.

A monomer mixture consisting of the following:

|  | Grams |
| --- | --- |
| glycidyl methacrylate | 294 |
| methyl methacrylate | 570 |
| butyl acrylate | 172 |
| styrene | 127 |
| methyacrylic acid | 12 |
| VAZO 64 | 23 | was added to the silicone resin solution at 106° C. in 3 hours and the reaction mixture held at 114°–116° C. for 3 more hours, and then let cool over night. The next morning the grafted reaction mixture was heated to 100° C. and a vacuum was applied to strip off solvent. The resin was quite thick. The viscosity of the resin on the ICI Cone and Plate viscometer at 200° C. was erratic. The tack temperature of the resin was 220° F. The color of the graft copolymer is of a milky opalescent color vs. clear for the acrylic copolymer by itself.

The foregoing detailed description and illustrative examples indicate the principles of this invention based on in-situ copolymerization of ethylenic monomers including glycidyl monomers in the presence of silicone resin to produce an in-situ formed graft copolymer mixture, but is not intended to be limiting except by the appended claims.

We claim:

1. An acrylic-silicone polymeric composition used as a polymeric binder in a coating, the polymeric composition comprising:
   an in-situ formed polymeric mixture comprising on a polymeric solids weight basis, between 30% and 90% acrylic copolymer and the balance being silicone resin, where said silicone resin comprises a silicone molecule having a number average molecular weight above 500 and having an average of more than one hydroxyl group and/or methoxy groups per silicone molecule, and where said acrylic copolymer is a copolymer of copolymerized ethylenically unsaturated monomers comprising by weight based on the monomers copolymerized between 30% and 95% acrylic monomer, between 1% and 50% glycidyl monomer, with the balance being other ethylenically unsaturated monomers, where the polymeric mixture is produced by copolymerizing said ethylenically unsaturated monomers in the presence of the said silicone resin; and
   wherein the polymeric mixture contains between 0.1% and 50% by weight organic diacid based on the weight of the polymeric mixture.

2. An acrylic-silicone polymeric composition used as a polymeric binder in a coating, the polymeric composition comprising:
   an in-situ formed polymeric mixture comprising on a polymeric solids weight basis, between 30% and 90% acrylic copolymer and the balance being silicone resin, where said silicone resin comprises a silicone molecule having a number average molecular weight above 500 and having an average of more than one hydroxyl group and/or methoxy groups per silicone molecule, and where said acrylic copolymer is a copolymer of copolymerized ethylenically unsaturated monomers comprising by weight based on the monomers copolymerized between 30% and 95% acrylic monomer, between 1% and 50% glycidyl monomer, with the balance being other ethylenically unsaturated monomers, where the polymeric mixture is produced by copolymerizing said ethylenically unsaturated monomers in the presence of said silicone resin; and
   where the polymeric mixture contains between 0.1% and 50% by weight organic polyfunctional acid based on the weight of the polymeric mixture.

3. In a process for producing acrylic modified silicone resin used as a binder in a coating, the process steps comprising:
   providing a silicone resin comprising a silicone molecule having a number average molecular weight above 500 and an average of more than one hydroxyl and/or methoxy groups per silicone molecule;
   copolymerizing ethylenically unsaturated monomers in the presence of said silicone resin, where said monomers comprise by weight based on the total weight of monomers copolymerized, between 30% and 95% acrylic monomer, between 1% and 50% glycidyl monomer, and the balance being other ethylenically unsaturated monomers; and
   wherein between 0.1% and 50% organic diacid is added to the polymeric mixture based by weight on polymeric mixture solids.

4. In a process for producing acrylic modified silicone resin used as a binder in a coating, the process steps comprising:
   providing a silicone resin comprising a silicone molecule having a number average molecular weight above 500 and an average of more than one hydroxyl and/or methoxy groups per silicone molecule;
   copolymerizing ethylenically unsaturated monomers in the presence of said silicone resin, where said monomers comprise by weight based on the total weight of monomers copolymerized, between 30% and 95% acrylic monomer, between 1% and 50% glycidyl monomer, and the balance being other ethylenically unsaturated monomers; and wherein between 0.1% and 50% organic polyfunctional acid is added to the polymeric mixture based on the weight of the polymeric mixture solids.

* * * * *